United States Patent Office 3,490,100
Patented Jan. 20, 1970

3,490,100
MOLD FOR MOLDING LINK CHAINS OF PLASTIC MATERIAL
Johannes Funke, Linden-Allee 16,
Cologne-Marienburg, Germany
Filed Sept. 5, 1967, Ser. No. 665,408
Claims priority, application Germany, Sept. 6, 1966,
W 42,368
Int. Cl. B29c *1/14*
U.S. Cl. 18—42                                      9 Claims

ABSTRACT OF THE DISCLOSURE

A mold for producing chain sections of plastic material with jointless links which mold permits simultaneous molding of chain sections of odd-numbered links even of circular cross-section of the links. Heretofore, difficulties were encountered, even when using four-part molds, to remove such molded chain sections from the mold because the undercuts made its opening impossible. When guiding two juxtaposed parts of said four mold parts, said two parts being freely movable towards and away from each other, with free play in guiding means under an acute angle, for instance, of 80°, with respect to the vertical central plane of the mold so as to engage the other two mold parts which are also freely movable towards and away from each other, and thereby to close the mold, the molded chain section can readily be removed on opening the mold. While the first two parts of the mold are joined to each other and are separated from each other by said guiding means, the other two parts of the mold are, for instance, pulled apart from each other by means of return springs.

The plastic material is injected into the mold through a channel which branches out crosswise into four channels of which two are connected to the cavities forming the middle link and the other two to the cavities forming the end part on each link adjoining the middle link and, if a five-link chain section is molded, the cavity forming the middle link is connected at its ends with the cavities forming the terminal links of the chain section.

By further increasing the number of supply channels accordingly, any odd-numbered ling chain section can be molded.

BACKGROUND OF THE INVENTION

The present invention relates to a mold for plastics and more particularly to an injection mold for producing chains of plastic materials or synthetic resins with weldless or jointless links of substantially circular cross-section, and to a process of producing such chains.

It is known to use molds having a split, four-part matrix with two jointing planes or faces which are arranged vertically to each other and which pass through the central planes of adjoining links. Such molds are used, for instance, to insert by injection molding weldlessly or jointlessly a single chain link into two prefabricated links positioned uprightly and edgewise in said mold. Thereby, the one jointing plane or face is arranged in the central plane of the link to be inserted while the other jointing plane or face is provided in the central planes of the prefabricated links which have been placed in corresponding recesses of the mold. When molding by injection a single link, there are no difficulties encountered provided the total height of the mold at the place of the recesses for the prefabricated links is dimensioned in such a manner that the split matrix, i.e. the four parts of the mold can be moved, on opening the mold with the chain links inserted therein, by at least half the thickness of the chain links in vertical direction to the jointing plane or face.

It is also known to produce by injection molding five links simultaneously. However, due to the difficulties encountered in removing the molded links from the mold, this process was applicable only to molding links with a flat, rectangular, or the like cross-section. Otherwise it was not possible to open the mold.

SUMMARY OF THE INVENTION

It is one object of the present invention to provide an injection mold which enables simultaneously molding more than one chain link, for instance, three or five, or even more, chain links of any cross-section and even of circular cross-section without difficulty, thus increasing the mold output considerably.

Other objects of the present invention and advantageous features thereof will become apparent as the description proceeds.

As stated above, when attempting simultaneously molding more than one chain link, the difficulty is encountered that the four parts of the mold cannot be taken apart and disassembled if the cross-section of the links is circular or nearly circular. This is due to the undercuts which make such disassembling theoretically impossible.

This difficulty is overcome by the present invention by guiding at least two juxtaposed parts of the mold by means of guiding means which are arranged in an acute angle to the central plane of the link enclosed by said parts. Even then, however, it is an essential feature of this invention that the guiding means are provided with a certain amount of free play or slackness. Surprisingly it has been found that the theoretically unsolvable problem of disassembling the mold parts can be solved only by causing firm and reliable assembly and closing of the mold parts, on the one hand, but by providing a certain free play or slackness in the sloping or slanting guiding means after a short lifting movement. A third essential feature of this invention is that the chain links remain deformable to a slight extent shortly after molding and, therefore, yield slightly. Experience has shown, that the chain links can be removed in this manner from the mold without difficulty and that their circular cross-section remains competely unaffected.

BRIEF DESCRIPTION OF DRAWINGS

In order that the invention may be more clearly understood, reference will now be made to the accompanying drawings which show some embodiments thereof by way of example. In said drawings—

DETAILED DESCRIPTION OF PREFERRED EMBODIMENT

Figure 1:
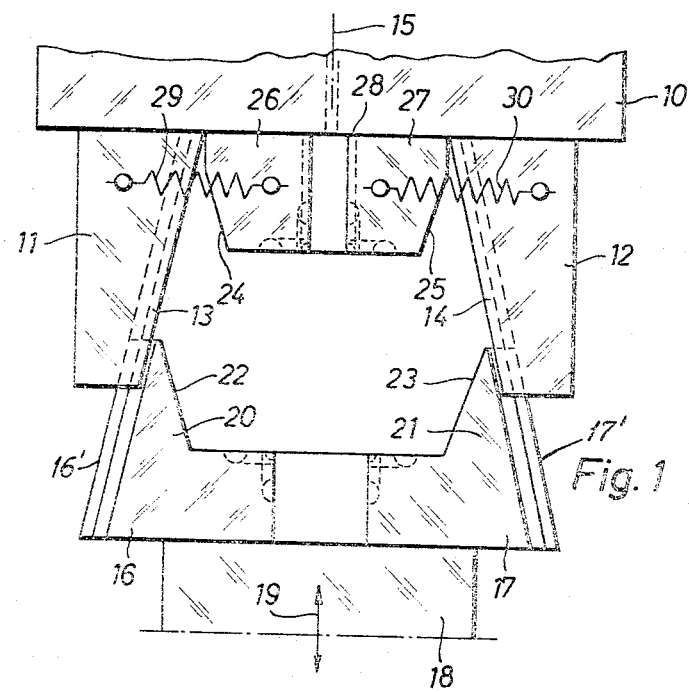
FIG. 1 is a cross-sectional view of a mold according to the present invention while in open condition.
Figure 2:
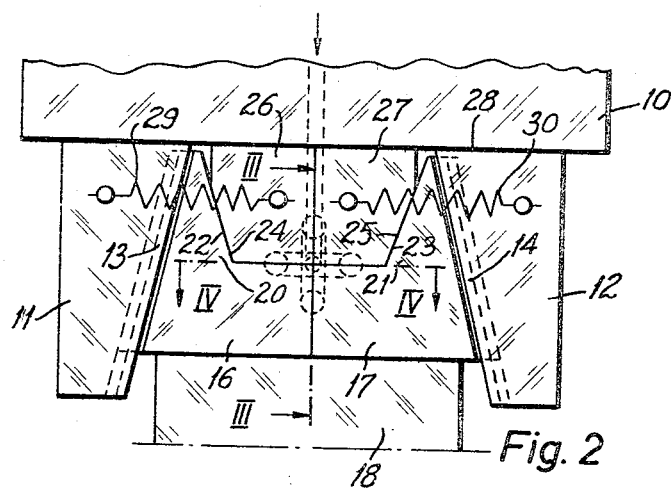
FIG. 2 is a cross-sectional view of the same mold in closed condition.

Referring now to the drawings, the mold according to this invention as illustrated in FIGS. 1 and 2 comprises stationary, fixed upper platen 10 with two lateral guiding blocks 11 and 12 provided with guide means such as recesses or grooves 13 and 14. Said guiding means 13 and 14 are arranged so that they form, for instance, an angle of about 80° with respect to the vertical central plane 15 of the mold. Two mold parts 16 and 17 forming the matrix are guided in said guiding means 13 and 14. Said parts 16 and 17 can be moved upwardly in the direction of arrow 19 by means of plunger 18. Thereby they are also moved horizontally towards each other until they contact each other as shown in FIG. 2. They are provided with upwardly directed projections or shoulders 20 and 21 with counter-guiding planes or surfaces 22 and 23. On moving upwardly, planes 22 and 23 of mold parts 16 and 17 are brought in contact with corresponding guiding planes 24 and 25 of two upper mold parts 26 and 27 serving as matrix which are movably arranged on basal plane or surface 28 of upper platen 10 in such a manner that said mold parts 26 and 27 can be moved horizontally and rectilineally towards each other. As shown in FIGS. 1 and 2, mold parts 16 and 17 have outer surfaces 16' and 17' which are slanted at about the same angle of inclination of 80° as the guiding means 13 and 14 of guiding blocks 11 and 12. Said mold parts 26 and 27 are pulled apart from each other by return springs 29 and 30 which are attached at their other ends to guide blocks 11 and 12 when the mold is opened. The four mold parts 16, 17, 26, and 27 are provided with cavities shaped as shown in FIGS. 3 and 4 to receive the plastic material for molding.

Figure 3:
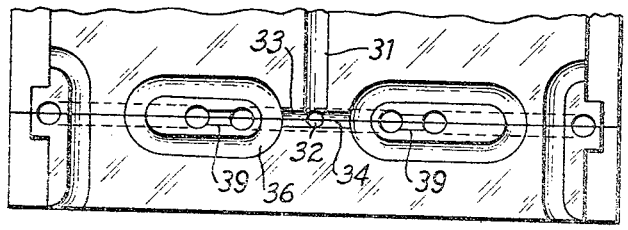
FIG. 3 is a sectional view through the mold according to FIG. 2 along the line III—III.
Figure 4:
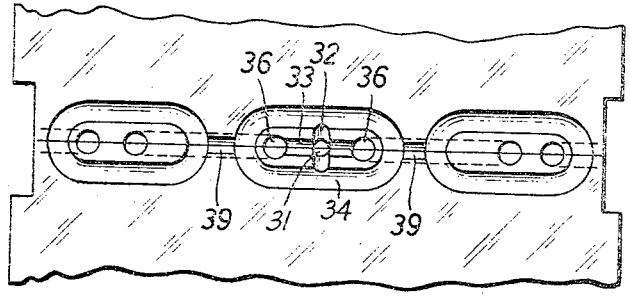
FIG. 4 is a sectional veiw through said mold of FIG. 2 along the line IV—IV.
Figure 5:
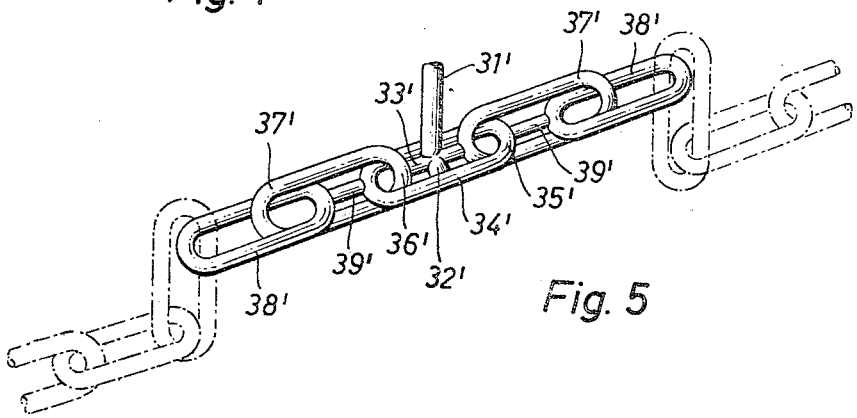
FIG. 5 is a schematic view of a chain with five links molded in a mold according to the present invention.

FIGS. 3 to 5 show injection channel 31 which branches out at its bottom into channels 32 and 33 forming a cross being coordinated in space. Channels 32 lead in both directions to the central part of the cavity 34 forming the legs or side parts 34' of link 35' arranged in the middle of the chain section of three or more links to be molded. Channels 33 lead to the cavities 36 forming the end parts 36' of adjoining links 37', said end parts 36' facing each other. According to FIG. 5 the cavity 34 forming the middle link 35' of the chain section to be molded thus is supplied with plastic material through two channels 32 while the cavities 37 forming the end of each of the adjoining links 37' are supplied therewith through channels 33. It is an essential feature of the present invention that, in case five or more links are to be molded, a larger amount of plastic material must be supplied to the cavity 34 forming middle link 34' because the cavities 38 forming links 38' positioned at the end of the chain section to be molded are connected with the cavity 34 forming said middle link 34' through channels 39. The chain section obtained on molding in the above described manner has five interconnected link members 34', 37', and 38' which are interconnected by intermediate sprues 31' and 32' attached to middle link 34', sprues 33' attached to links 37' adjoining middle link 34', and sprues 39' connecting links 34' and 38'. These intermediate connecting pieces or sprues are subsequently removed from the molded chain section, for instance, by nipping or cutting them off.

Molding of chain sections of three or more links according to the present invention is effected by first closing the mold by moving mold parts 16 and 17 upwardly whereby their faces or planes 22 and 23 engage the faces or planes 24 and 25 of mold parts 26 and 27. At the same time mold parts 16 and 17 are guided by guiding blocks 11 and 12 and said parts as well as parts 26 and 27 are moved towards each other to form the mold. After the mold has been closed in this manner, the plastic material is injected thereinto through channel 31 and forms link 34' by passing through channels 32, links 37' by passing through channels 33, and links 38' by passing from link 34' through channel 39. After allowing the plastic material to solidify, the mold is opened by moving downwardly plunger 19 with mold parts 16 and 17 which are horizontally movably atached thereto. On such downward movement mold parts 16 and 17 are separated from each other by guiding means 13 and 14 in guiding blocks 11 and 12 while mold parts 26 and 27 are separated from each other by return springs 29 and 30. The molded chain section can then readily be removed from the mold and the molding process can be repeated.

The mold as well as the process of this invention may, of course, be subject to modifications. Thus it is possible to produce chain sections of another cross-section than circular cross-section. The advantages of the mold as well as of the process according to the present invention are obtained in all those cases in which the cross-section of the chain links shows undercuts which render it impossible to separate the four parts of the mold from each other in the usual manner. The inside length of the links may also be varied because it is not necessary, as has been required heretofore, to insert by injection molding a connecting link into the prefabricated links positioned edgewise uprightly in the mold. Thus it is possible to produce, according to the present invention, also chain sections of links of a shorter inside length. It is also possible to provide a mold, the cavity of which will produce chain sections in which only the terminal links have a larger inside length and which thus permit to position them edgewise uprightly into the mold. Channels 31, 32, 33, and 39 may also be arranged in a different manner. The angle under which guiding means 13 and 14 are arranged with respect to vertical central plane 15 of the mold may differ from an angle of 80° provided it is an acute angle with respect to said plane 15.

The plastic material used to make the chain links and chain sections may be preberably polyamide polyethylene and other suitable plastic materials.

Of course, many other changes and variations may be made by those skilled in the art in accordance with the principles set forth herein and in the claims annexed hereto.

I claim:

1. Mold for producing chain sections of plastic material having jointless links, said mold comprising an upper platen, two guiding blocks firmly attached thereto, said guiding blocks having guiding means, said guiding means being arranged at an acute angle with respect to the central plane of the mold, four mold parts with two jointing planes arranged vertically to each other and passing through the central planes of adjoining links, at least two of said mold parts being juxtaposed, said first two mold parts being guided with free play in said guiding means under an acute angle with respect to said vertical central plane of the mold, said first two mold parts engaging the other mold parts to enclose the cavity of the mold, cavities provided in the four mold parts, said cavities corresponding, when the mold is closed, to the link chain section to be molded, means for guiding said first mold parts in said guiding means to engage and disengage the other mold parts and to open and close the mold, and means for supplying the plastic material to the mold cavity.

2. The mold according to claim 1, wherein the acute angle at which the guiding means guide the juxtaposed first mold parts with respect to the vertical central plane of the mold is an angle of about 80°.

3. The mold according to claim 1, wherein the other two mold parts are arranged so as to be vertically removable from the vertical central plane of the mold.

4. The mold according to claim 1, wherein return springs are attached to said two other mold parts, the opposite ends of said return springs being fastened to said guiding blocks, said return springs separating and pulling said other two mold parts away from each other on opening the mold.

5. The mold according to claim 1, wherein said two first mold parts are provided with counter-guiding means inclined inversely to said guiding means so as to cause movement of the other two mold parts towards each other to close the mold.

6. The mold according to claim 5, wherein the counter-guiding means are shaped as counter-guiding planes engaging and enclosing the other two mold parts.

7. The mold according to claim 1, wherein the cavities corresponding to the link chain sections, when the mold is closed, are cavities for molding a link chain section of three links and wherein an injection channel is provided vertically to the center of the middle link of the chain section to be molded, said injection channel branching out into connecting channels forming a cross being coordinated in space, two of the branches of said cross of connecting channels being connected to the cavities forming the legs of said middle link and each of the other two branches being connected to the cavities forming the end parts of each of the links adjoining the middle link.

8. The mold according to claim 1, wherein the cavities corresponding to the link chain sections, when the mold is closed, are cavities for molding a link chain section of five links, wherein an injection channel is provided vertically to the center of the middle link of the chain section to be molded, said injection channel branching out into connecting channels forming a cross being coordinated in space, two of the branches of said cross of connecting channels being connected to the cavities forming the legs of said middle link and each of the other two branches being connected to the cavities forming the end parts of each of the links adjoining the middle link, and wherein connecting channels are provided connecting the cavities forming the end parts of each of the links following said links adjoining the mddle link with the cavities forming the end parts of said middle link.

9. Mold for producing chain sections of plastic material having jointless links, said mold comprising an upper platen, two guiding blocks firmly attached thereto, said guiding blocks having guiding means, said guiding means being arranged at an acute angle with respect to the central plane of the mold, four mold parts with two jointing planes arranged vertically to each other and passing through the central planes of adjoining links, at least two of said mold parts beig juxtaposed, said first two mold parts being guided with free play in said guiding means under an acute angle with respect to said vertical central plane of the mold, said first two mold parts being provided with counter-guiding means inclines inversely to said guiding means, said counter-guiding means engaging and enclosing the other two mold parts to enclose the cavity of the mold formed by said four mold parts on guiding the first two mold parts in said guiding means, said other two mold parts being separable from each other, on opening the mold, by spring means, the one end of said spring means being attached to said other two mold parts and the other end to said guiding blocks, cavities provided in the four mold parts, said cavities corresponding, when the mold is closed, to the link chain section to be molded, means for guiding said first mold parts in said guiding means to engage and disengage the other mold parts and to open and close the mold, and means for supplying the plastic material to the mold cavity.

References Cited

UNITED STATES PATENTS

| | | | |
|---|---|---|---|
| 510,748 | 12/1893 | While | 249—57 |
| 1,475,032 | 11/1923 | Shrum et al. | |
| 2,051,653 | 8/1936 | Rich | 249—57 |
| 2,891,283 | 6/1959 | Cramer et al. | |
| 3,092,916 | 9/1962 | Campbell. | |
| 3,333,299 | 8/1967 | Florjancic. | |
| 3,373,460 | 3/1968 | Ladney. | |
| 3,427,801 | 2/1969 | McLeish | 249—57 X |

FOREIGN PATENTS 1,456,775   9/1966   France.

J. HOWARD FLINT, Jr., Primary Examiner

U.S. Cl. X.R.

249—57